(12) United States Patent
Aschauer

(10) Patent No.: US 8,066,107 B2
(45) Date of Patent: Nov. 29, 2011

(54) MODULATABLE MARINE TRANSMISSION CLUTCHES INCLUDING FLUID-OPERATED NONROTATING PISTONS FOR CLUTCH ENGAGEMENT

(76) Inventor: George Reisch Aschauer, Bemidji, MN (US)

( * ) Notice: Subject to any disclaimer, the term of this patent is extended or adjusted under 35 U.S.C. 154(b) by 0 days.

(21) Appl. No.: 12/592,295

(22) Filed: Nov. 23, 2009

(65) Prior Publication Data

US 2010/0212442 A1   Aug. 26, 2010

Related U.S. Application Data

(63) Continuation-in-part of application No. 11/364,783, filed on Feb. 27, 2006, now Pat. No. 7,793,768.

(51) Int. Cl.
*F16D 25/10* (2006.01)
(52) U.S. Cl. ............... 192/48.603; 192/51; 192/85.49; 192/110 B

(58) Field of Classification Search ............ 192/21, 192/51, 48.602, 48.603, 48.604, 48.605, 192/85.49, 48.601; 74/361
See application file for complete search history.

(56) References Cited

U.S. PATENT DOCUMENTS

| 2,851,895 | A  | * | 9/1958 | Aschauer ............... 74/361 |
| 4,186,829 | A  | * | 2/1980 | Schneider et al. ......... 192/85.31 |
| 4,607,736 | A  | * | 8/1986 | Kelley ................. 192/48.605 |
| 4,664,240 | A  | * | 5/1987 | Majima et al. ........... 192/85.49 |
| 2005/0049106 | A1 | * | 3/2005 | Stevenson et al. ........... 475/296 |
| 2008/0047800 | A1 | * | 2/2008 | Borgerson et al. ......... 192/85 R |
| 2008/0214355 | A1 | * | 9/2008 | Capito et al. .............. 192/85 R |

\* cited by examiner

*Primary Examiner* — Rodney Bonck

(57) ABSTRACT

A marine reverse and reduction transmission with modulatable marine transmission clutches including fluid operated nonrotating pistons for effecting clutch engagement by compression of the plates, the pistons generating thrust that is transferred through bearings between the pistons and the rotating clutch packs and gears to the transmission housing parts.

3 Claims, 2 Drawing Sheets

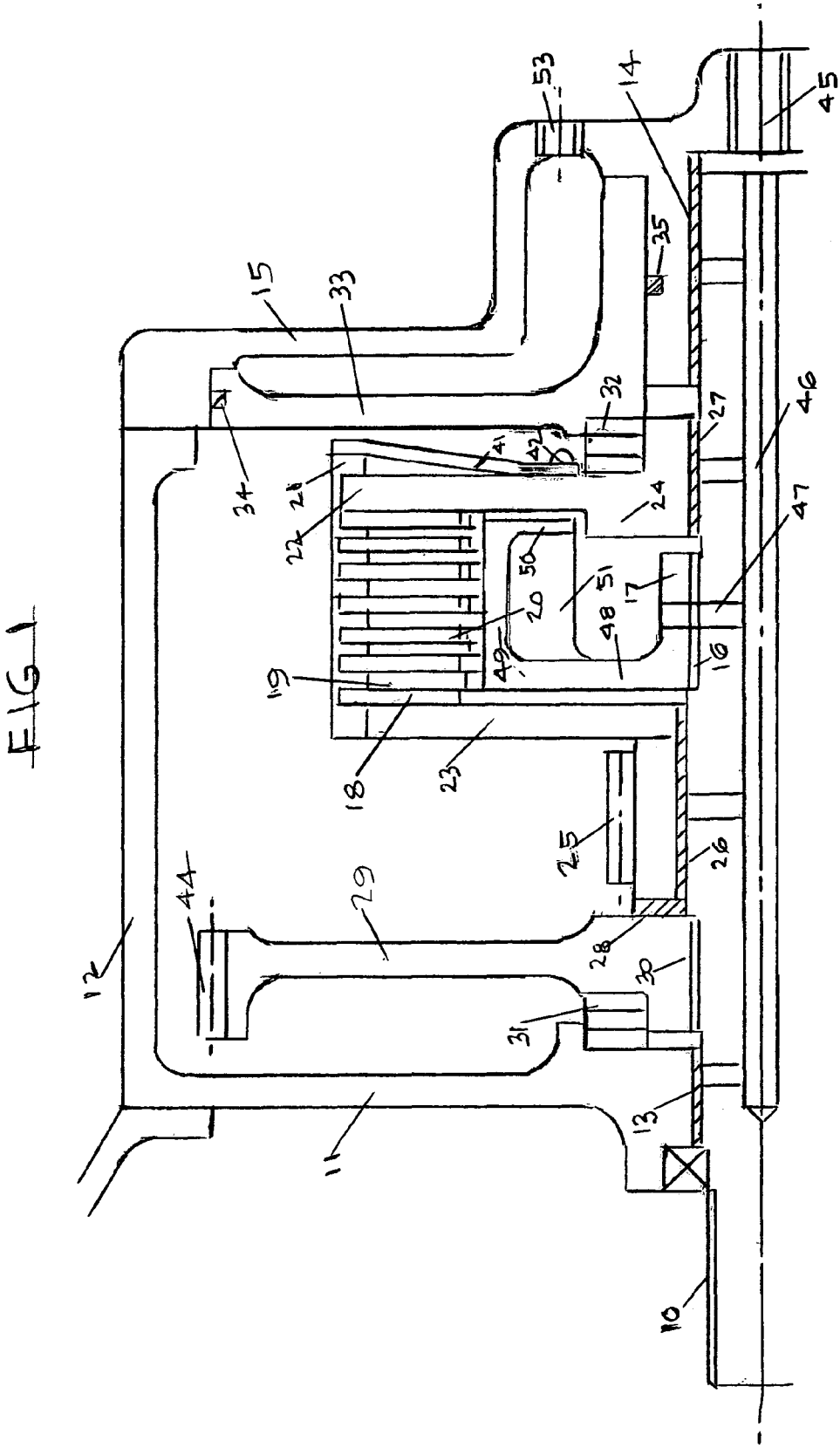

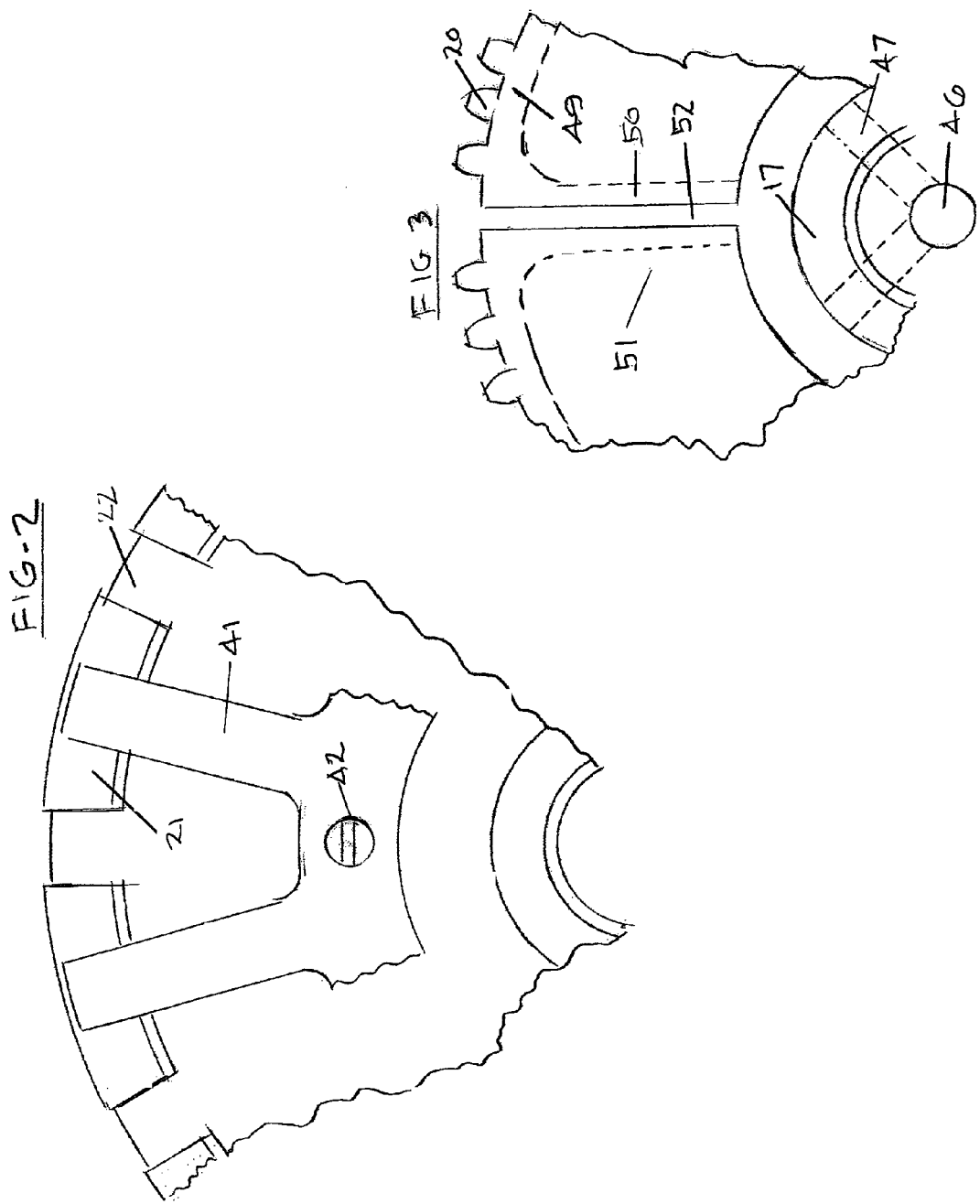

MODULATABLE MARINE TRANSMISSION CLUTCHES INCLUDING FLUID-OPERATED NONROTATING PISTONS FOR CLUTCH ENGAGEMENT

CONTINUATION-IN-PART APPLICATION

This application is a continuation-in-part of U.S. patent application Ser. No. 11/364,783, filed Feb. 27, 2006, and now U.S. Pat. No. 7,793,768.

BACKGROUND OF THE INVENTION

The invention relates to the design of selectively operable friction clutches in a marine transmission to provide forward and reverse drives to the propeller shaft of a vessel.

U.S. Pat. No. 2,851,895 Aschauer describes a marine transmission drive that has been extensively used. It is intended that the gearing and clutch locations shown on U.S. Pat. No. 2,851,895 be utilized for this invention. These gear and shaft locations are shown on end view FIG. 3. Clutches are mounted on the input shaft and countershaft in transverse coplanar relationship, shown on FIGS. 1 and 2 of U.S. Pat. No. 2,851,895.

U.S. Pat. No. 2,851,895, filed 1953, describes a marine reverse and reduction gear. FIG. 1 shows how input power from an engine drives two input members of multiple plate oil lubricated friction clutches in reverse rotations, as shown by FIGS. 2 and 3. The output of an engaged clutch drives 35 for forward and pinion 58 for reverse. The pinions mesh with output gear 36 on shaft 37 to drive a propeller either forward or reverse. Cooling oil passes through small holes in the input members plates drive.

It is to be noted that the clutches utilized in the aforementioned patent are engaged by applying oil pressure to rotating annular pistons housed in their respective cylinders. Clutch speed is generally at engine speed with the forward and reverse clutches rotating in opposite direction. Over the past fifty years, engine speeds have increased substantially, some now up to 3000 RPM. Clutch apply piston pressure and thrust caused by centrifugal force have risen as clutch speed squared and now require significant release spring effort to hold a clutch not engaged in the released position.

BRIEF SUMMARY OF THE INVENTION

The invention relates to the engaging means for forward and reverse wet multiple plate clutches in a marine transmission, using nonrotating hydraulic activated pistons to provide clutch engagement through thrust bearings to the rotating plate stacks. Centrifugal piston thrust and its release spring force is avoided. The invention provides simplified clutch modulation over a wider speed range and improved confined plate cooling, including cooling pumping action. A clutch plate stack may be compressed from both ends utilizing helical gear thrust, as will be further developed. Rotating piston outer diameters usually mimic the friction plate outer diameter. FIG. 1 exaggerates its piston outer diameter to demonstrate that its diameter, thrust, and pressure are not dictated by the facings.

BRIEF DESCRIPTION OF THE DRAWINGS

FIG. 1 is a longitudinal section of a marine transmission clutch or its clutch countershaft. The only difference between the two is a splined input engine drive shown.

FIG. 2 is a multiple finger spring used for clutch and piston disengagement.

FIG. 3 is a transverse section of a friction plate cooling method providing uniform plate cooling distribution and increased plate cooling pressure.

DETAILED DESCRIPTION OF THE INVENTION

Referring to FIG. 1, input shaft 10 is appropriately attached to a driving member, such as the flywheel of a vessel's power plant (not shown). The shaft is journaled by bearing 13 carried by housing wall 11 at the input and journaled by bearing 14 carried by end plate cover wall 15 detachable from housing 12. Input hub 17 is attached to input shaft 10 by close-fitting splines 16 in the conventional manner. Interleaved friction plates 19 and spacer plates 18 make up a friction plate stack package. Input hubs gear teeth 20 support and drive friction plates 19 providing sliding engagement. Spacer plates 18 have lugs 22 that engage with cantilever beams 21 that support and drive the spacer plates 18 and provide sliding engagement. Cantilever beams 21 are integrally attached to output member backplate 23. Pressure plate 24 has lugs 22 that are thicker lengthwise than the lugs on spacer plates 18 and also engage with cantilever beams 21 in like manner. Backplate 23 is integrally attached to drive pinion 25 and supported on shaft 10 by bearing 26. Pressure plate 24 is likewise supported on shaft 10 by bearing 27. A confined annular chamber is bounded by the plate stack inner diameter at its outside, hub 17 at the inside, backplate 23 on the resisting side, and pressure plate 24 on the engaging side. Clutch clamping thrust is carried axially by pinion 25 through plain thrust bearing 28 to transfer gear 29, which is attached to shaft 10 by close-fitting splines 30. Clutch clamping thrust from transfer gear 29 is transferred through antifriction thrust bearing 31 to housing wall 11. Antifriction thrust bearing 32, which may be similar to thrust bearing 31, transfers clutch clamping thrust from the relatively stationary piston 33 engaging system to the rotating clutch elements.

For the marine transmission the difference between this application and application Ser. No. 11/364,783 is the use of nonrotating fluid engaged pistons 33 as the forward and reverse clutch engaging means. Piston 33 is retained in housing 15 and prevented from rotation with respect to housing 15 by not shown means. Seals 34 and 35 retain fluid pressure applied through passage 53 in housing 15 to engage the clutch plate stack through thrust bearing 32. The forward and reverse clutch pistons may or may not be the same outside diameter but the sum of their radii must not exceed the sum of the transfer gears 29 radii.

FIG. 2 shows finger spring 41 attached to pressure plate 24 by screws 42. The fingertips bear against cantilever beam 21 ends to establish proper clutch plate released clearance. Spring 41 also sets up an overall axial force to maintain proper residual contact for thrust bearings and piston engaging components when the clutch is disengaged.

FIG. 3 and FIG. 1 describe a cooling method that avoids the use of small holes that may be blocked by the inner plate teeth as used in the past.

Oil is introduced into shaft 10 through port 45 in housing end cover wall 15. FIG. 3 shows an end view of hub member 17 having external teeth 20, driving friction plates 19. Oil introduced through inlet 45 flows axially through shaft longitudinal hole 46 and radially outward through passages 47 to fill a series of individual cavities 51, each bounded by drive wall 48, cylindrical top wall 49, and retaining wall 50. During clutch rotation, cooling oil flows into the individual cavities 51 inwardly filling them. Added oil then flows under the bottoms of spaced radial walls 50 discharging outwardly through radial slot passages 52 cut completely through walls 50. Pump passage 52 delivers pressure and oil flow uniformly across the complete friction pack inner diameter.

The pumping passages 52 are sealed by the engaged plate stack to maintain a pressure head under them, an advancement over the drilled holes used in U.S. Pat. No. 2,851,895.

During continuous clutch slip utilizing hydroviscous power transmission, the complete confined annular chamber may be filled with oil pressure raised to drive the required oil flow through the entire stack friction plate face grooving. Operating a released clutch with the oil filled confined annular chamber could provide objectional drag where an air/oil mix may not.

A marine gear transmission may require high level clutch torque for full engine power or lower level varying torque for clutch modulation when trolling, acting to provide constant propeller speed with variation of engine input speed or clutch friction coefficient. This requires continuous slipping of an oil cooled clutch, to tow a load or, during docking. Clutch engaging pressure is regulated to sense and maintain constant propeller speed.

In a multiple plate clutch having a fluid operated movable piston for effecting clutch operation by compression of the plates, it is known that the compressive force degrades due to tooth friction of both the friction plates and the spacer plates. This is due to plate tooth friction losses between the teeth or lugs and their support members, and tends to limit the number of plates usable as the compressive force degrades, as well as reduction of the energy absorption per plate. The obvious answer to compress the plate stack from both ends has not been achieved because of complexity and cost.

Refer to FIG. 1. Since the compressive force on the plate and the resisting force is carried by heavy duty thrust bearings, the pressure plate member 24, and backing plate 23 are free floating. The helical thrust of pinion 25 and gear 29 may be arranged to oppose the clamping force of the piston 33 allowing compression to both ends of the clutch pack. Gear design authorities suggest that the helix angle range between 15° and 30°, a 20° angle could provide clamp opposite and approaching the piston clamp force. It may be possible with the cooling provided, to modulate the clutches up to full speed of both engine and propeller with the maximum horsepower to heat of 15% at approximately 65% propeller speed and 100% engine speed. Ref. A.S.M.E. publication 76-GT-65.

Pulse engagement plate energy absorption for a crash back occurrence need be examined.

It is anticipated that screws bearing against the piston may provide:

Part tolerance adjustment.
Flutter amplitude control.
"Come Home" features.
The invention claimed is:

1. A marine reversing transmission including two interleaved plate clutches, one to provide forward vessel motion, the other reverse motion, each of said plate clutches having a fluid-actuated piston that applies an axial clutch plate stack clamping force through a bearing to a pressure plate, the clamping force resisted by a clutch plate stack resisting force provided by a wall of a stationary marine transmission housing and acting through a bearing, a transfer gear and an integrated combined back plate and pinion component, a pinion portion of said combined back plate and pinion component adapted to cooperate with a second gear to provide a speed reduction to a marine propeller.

2. The marine reversing transmission of claim 1 wherein the fluid-actuated piston is a nonrotating piston and is received in a nonrotating cylinder in a second wall of the stationary marine transmission housing axially opposing said wall of the stationary marine transmission housing.

3. A marine reversing transmission including a stationary housing enclosing two interleaved plate clutches, one to provide forward vessel motion, the other reverse motion, each clutch having a clutch plate axial engaging force provided by a nonrotating fluid-actuated piston received in a nonrotating cylinder in a first wall of the stationary housing, the axial engaging force passing through a bearing to provide engaging movement of a pressure plate; and an axial resisting force is provided by a floating back plate rigidly attached to a reduction gear pinion, the resisting force provided through a transfer gear to a bearing and then to a second wall of the stationary housing axially opposite the first wall.

\* \* \* \* \*